(12) United States Patent
Rabii

(10) Patent No.: US 9,049,663 B2
(45) Date of Patent: Jun. 2, 2015

(54) PROCESSING INVOLVING MULTIPLE SENSORS

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 12/965,695

(22) Filed: Dec. 10, 2010

(65) Prior Publication Data

US 2012/0147531 A1 Jun. 14, 2012

(51) Int. Cl.
*G08B 1/08* (2006.01)
*H04W 52/02* (2009.01)

(52) U.S. Cl.
CPC .................................. *H04W 52/0254* (2013.01)

(58) Field of Classification Search
USPC ............... 340/539.3, 539.13, 539.22, 539.25, 340/540, 541, 545.2, 553; 455/574, 127.5
See application file for complete search history.

(56) References Cited

U.S. PATENT DOCUMENTS

| | | | |
|---|---|---|---|
| 5,396,443 A | 3/1995 | Mese et al. | |
| 7,408,506 B2 | 8/2008 | Miller | |
| 2003/0008690 A1 | 1/2003 | Guterman | |
| 2003/0129995 A1 | 7/2003 | Niwa et al. | |
| 2004/0212677 A1* | 10/2004 | Uebbing | 348/155 |
| 2006/0258292 A1 | 11/2006 | Kato et al. | |
| 2007/0142098 A1 | 6/2007 | Behzad et al. | |
| 2007/0188650 A1* | 8/2007 | Kobayashi et al. | 348/344 |
| 2008/0024297 A1* | 1/2008 | Maki et al. | 340/552 |
| 2008/0234935 A1* | 9/2008 | Wolf et al. | 701/216 |
| 2008/0305838 A1 | 12/2008 | Joo | |
| 2009/0161026 A1* | 6/2009 | Wu et al. | 348/734 |
| 2009/0164072 A1 | 6/2009 | Vaysse et al. | |
| 2009/0164813 A1 | 6/2009 | Tu et al. | |
| 2009/0233650 A1 | 9/2009 | Hosono | |
| 2010/0181988 A1 | 7/2010 | Hong et al. | |
| 2011/0037616 A1* | 2/2011 | Leutelt et al. | 340/901 |

FOREIGN PATENT DOCUMENTS

| | | |
|---|---|---|
| EP | 1772977 A2 | 4/2007 |
| EP | 1772978 A2 | 4/2007 |
| JP | H06119090 A | 4/1994 |
| JP | 11083529 A | 3/1999 |
| JP | 2000352519 A | 12/2000 |
| JP | 2003204572 A | 7/2003 |
| JP | 2005064562 A | 3/2005 |

(Continued)

OTHER PUBLICATIONS

International Search Report and Written Opinion—PCT/US2011/064281—ISA/EPO—Jun. 18, 2012.

*Primary Examiner* — Steven Lim
*Assistant Examiner* — Hongmin Fan
(74) *Attorney, Agent, or Firm* — Campbell Chiang; Espartaco Diaz Hidalgo

(57) ABSTRACT

In a particular embodiment, an apparatus includes a first sensor that has an active mode and a dormant mode. When operating in the active mode, the first sensor has a first power consumption level. The apparatus further includes a second sensor that has a second power consumption level that is less than the first power consumption level (i.e., the power consumption level of the first sensor). The second sensor is deactivated when the first sensor is operating in the active mode. The apparatus includes logic to activate the second sensor when the first sensor transitions from the active mode to the dormant mode.

25 Claims, 7 Drawing Sheets

(56) References Cited

FOREIGN PATENT DOCUMENTS

| | | |
|---|---|---|
| JP | 2008312047 A | 12/2008 |
| JP | 2010151759 A | 7/2010 |
| JP | 2012518828 A | 8/2012 |
| JP | 2012520051 A | 8/2012 |
| KR | 20100086141 A | 7/2010 |
| WO | 2009008411 A1 | 1/2009 |
| WO | 2009011593 A1 | 1/2009 |
| WO | 2010095075 A1 | 8/2010 |
| WO | 2010104772 A1 | 9/2010 |

* cited by examiner

US 9,049,663 B2

PROCESSING INVOLVING MULTIPLE SENSORS

I. FIELD

The present disclosure is generally related to processing involving multiple sensors.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A typical wireless telephone may include multiple sensors with variable power consumption levels. Some of the sensors may provide higher resolution sensing capabilities than other sensors. A sensor with a higher resolution sensing capability may consume more power than a sensor with a lower resolution sensing capability. In order to conserve power, it may be desirable to disable a sensor with a higher power consumption level. However, by disabling such a sensor, the wireless telephone may not be able to maintain environmental awareness.

III. SUMMARY

An apparatus such as a mobile phone or personal digital assistant has different sensors that can inter-operate to increase performance and reduce power consumption (i.e., improve battery life). When a sensor with a relatively high power consumption level enters a dormant mode, a second sensor with a relatively low power consumption level may be activated. While the second sensor may consume less power, the second sensor may provide lower resolution sensing capabilities than the first sensor. However, the second sensor may enable the apparatus to continue monitoring for a stimulus (i.e., movement of an object or movement of the apparatus). Upon detecting such a stimulus, the higher resolution sensor may be awakened from the dormant mode.

In a particular embodiment, an apparatus includes a first sensor that has an active mode and a dormant mode. When operating in the active mode, the first sensor has a first power consumption level. The apparatus further includes a second sensor that has a second power consumption level that is less than the first power consumption level (i.e., the power consumption level of the first sensor). The second sensor is deactivated when the first sensor is operating in the active mode. The apparatus includes logic to activate the second sensor when the first sensor transitions from the active mode to the dormant mode.

In another particular embodiment, a method includes activating a second sensor of an apparatus upon detection of a first sensor transitioning from an active mode to a dormant mode. The second sensor is deactivated when the first sensor is in the active mode. The first sensor has a first power consumption level when operating in the active mode. The second sensor (when activated) has a second power consumption level that is less than the first power consumption level. In a particular embodiment, zero power is consumed by the second sensor when the second sensor is deactivated.

One particular advantage provided by at least one of the disclosed embodiments is the ability of an apparatus to continue monitoring for a stimulus (i.e., movement of an object or movement of the apparatus) while a primary sensor with a relatively high power consumption level is in a dormant mode, using a secondary sensor that is normally deactivated.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

An apparatus may include multiple sensors that are able to detect similar stimuli. For example, a video camera can be used to visually detect gestures or other visual stimuli, while an echolocator can be used to detect a change in an object's position based on ultrasound ranging. The video camera can have a higher power consumption level during an active mode than the echolocator and may also have a dormant mode (e.g., a sleep mode). To conserve power, the video camera may transition to the dormant mode. To maintain environmental awareness, the apparatus may include a controller or other circuitry to activate echolocation when the video camera enters a dormant mode, and may wake the video camera when the echolocation detects a stimulus.

As another example, a global positioning system (GPS) sensor can be used to determine a position of the apparatus. The GPS sensor can be controlled to enter a dormant mode to conserve power. An accelerometer or other motion detector can be used to detect a movement of the apparatus and may use less power than the GPS sensor in an active mode. When the GPS sensor enters the dormant mode, the accelerometer can be activated to maintain an awareness of movement of the apparatus. When the accelerometer detects movement of the apparatus, the GPS sensor can be activated to more accurately track a location of the apparatus.

Figure 1:
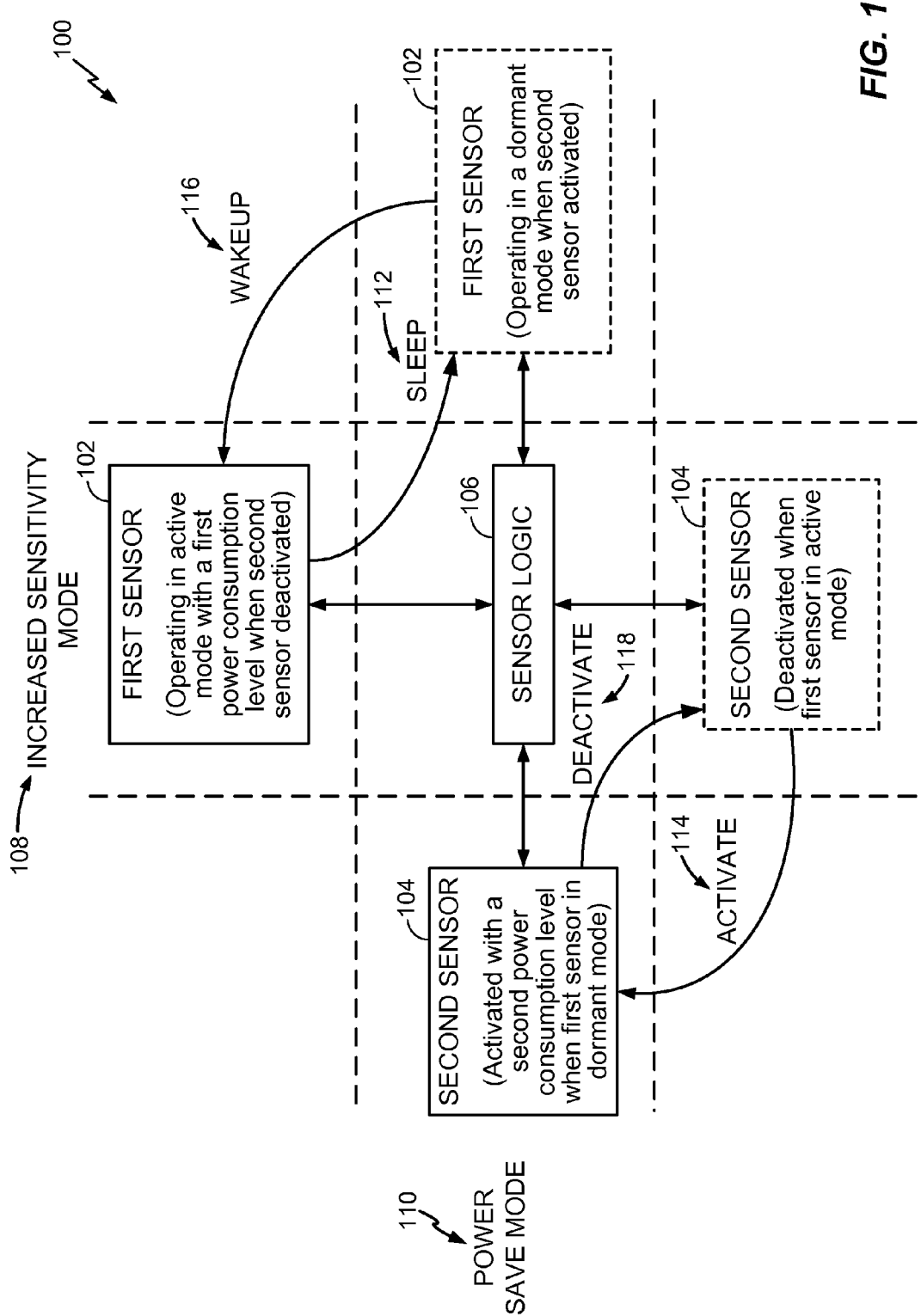
FIG. 1 is a block diagram of a first particular illustrative embodiment of a system of cooperative processing among sensors to improve battery life.

Referring to FIG. 1, a particular illustrative embodiment of a system of cooperative processing among sensors to improve battery life is disclosed and generally designated 100. The system 100 of FIG. 1 illustrates that cooperative processing may enable an apparatus to conserve battery life while maintaining environmental awareness when a primary sensor is dormant, utilizing a secondary sensor that consumes less power than an active primary sensor.

The system 100 of FIG. 1 includes a first sensor 102, a second sensor 104, and sensor logic 106. The sensor logic 106 is operable to detect the first sensor 102 transitioning from an active mode to a dormant mode. The sensor logic 106 may also be operable to instruct the first sensor 102 to transition from the active mode to the dormant mode. Further, the sensor logic 106 is operable to activate the second sensor 104 upon detecting the first sensor 102 transitioning to the dormant mode, where the second sensor 104 is deactivated when the first sensor 102 is in the active mode. Alternatively, the second sensor 104 may be operating in a dormant mode when the first sensor 102 is in the active mode. The second sensor 104 may be activated in response to the first sensor 102 transitioning to the dormant mode, at substantially the same time as the first sensor 102 is transitioning to the dormant mode, after the first sensor 102 transitions to the dormant mode, or before the first sensor 102 has transitioned to the dormant mode. The first sensor 102 has a first power consumption level when operating in an active mode. The second sensor 104 (when activated) has a second power consumption level that is less than the first power consumption level of the first sensor 102. The second sensor 104 is deactivated when the first sensor 102 is operating in the active mode.

In the embodiment illustrated in FIG. 1, the sensor logic 106 is operable to instruct the first sensor 102 to transition from the dormant mode to the active mode in response to the second sensor 104 detecting a stimulus. Further, the sensor logic 106 is operable to deactivate the second sensor 104 in response to the first sensor 102 transitioning to the active mode to reduce power consumption. For example, the second sensor 104 may consume zero power when the second sensor 104 is deactivated.

The first sensor 102 and the second sensor 104 may be operable to detect movement of an object (that is external to an apparatus), where the first sensor 102 provides higher resolution sensing of movement of the object than the second sensor 104. As another example, the first sensor 102 and the second sensor 104 may be operable to detect movement of an apparatus (that includes the first sensor 102 and the second sensor 104), where the first sensor 102 provides higher resolution sensing of movement of the apparatus than the second sensor 104.

When operating in an increased sensitivity mode 108 (i.e., with a relatively high power consumption level), the first sensor 102 is in an active mode and the second sensor 104 is deactivated. When operating in a power save mode 110 (i.e., with a relatively low power consumption level), the first sensor 102 is in a dormant mode and the second sensor 104 is activated. As illustrated in FIG. 1, when the first sensor 102 transitions from the increased sensitivity mode 108 to the power save mode 110 (i.e., "sleeps," as shown at 112), the sensor logic 106 activates the second sensor 104 (as shown at 114). Further, when the first sensor 102 transitions from the power save mode 110 to the increased sensitivity mode 108 (i.e., "wakes up," as shown at 116), the sensor logic 106 deactivates the second sensor 104 (as shown at 118). Thus, FIG. 1 illustrates that selectively activating and deactivating a secondary sensor that consumes less power (i.e., the second sensor 104) than a primary sensor (i.e., the first sensor 102) may provide increased battery life while maintaining environmental awareness.

Figure 2:
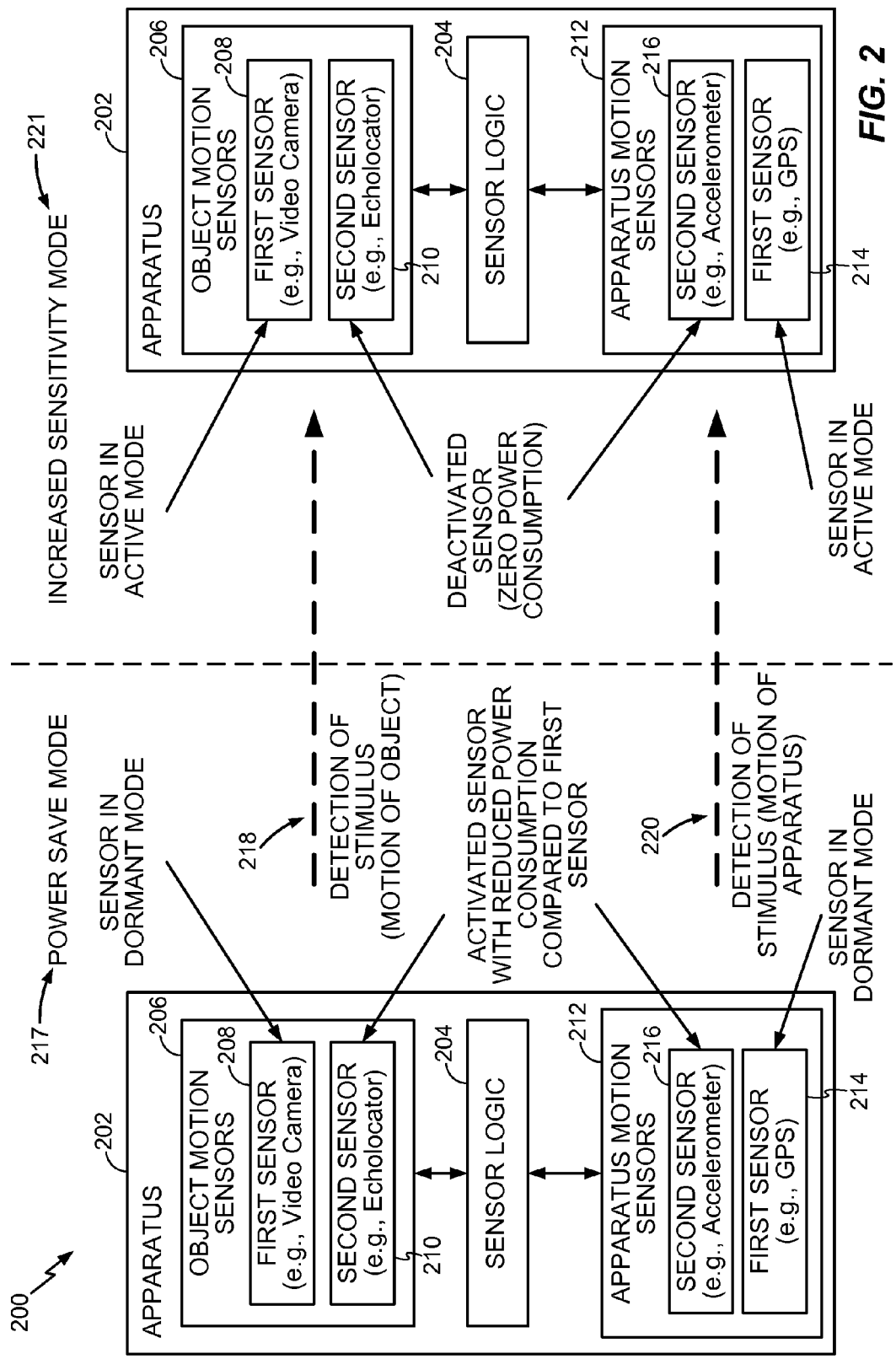
FIG. 2 is a block diagram of a second particular illustrative embodiment of a system of cooperative processing among sensors to improve battery life.

Referring to FIG. 2, another particular illustrative embodiment of a system of cooperative processing among sensors to improve battery life is disclosed and generally designated 200. The system 200 of FIG. 2 illustrates that cooperative processing may enable an apparatus 202 to transition from a power save mode to an increased sensitivity mode in response to a secondary sensor that maintains environmental awareness detecting a stimulus. Thus, a relatively high-power sensor of the apparatus 202 may remain dormant until a relatively low-power sensor detects a stimulus, in order to improve battery life of the apparatus 202.

In the embodiment illustrated in FIG. 2, the apparatus 202 includes sensor logic 204 in communication with a plurality of object motion sensors 206 and with a plurality of apparatus motion sensors 212. For example, the plurality of object motion sensors 206 may include a first sensor 208 (e.g., a video camera) and a second sensor 210 (e.g., an echolocator). The plurality of apparatus motion sensors 212 may include a first sensor 214 (e.g., a global positioning system (GPS) sensor) and a second sensor 216 (e.g., an accelerometer). Alternatively, the second sensor 216 may include a gyroscope, a compass, or other motion detector. In alternative embodiments, the apparatus 202 may include sensors other than the plurality of object motion sensors 206 and the plurality of apparatus motion sensors 212.

As illustrated in FIG. 2, in a power save mode 217, the first sensors 208, 214 are in a dormant mode, and the second sensors 210, 216 are activated. The second sensors 210, 216 have reduced power consumption levels with respect to the first sensors 208, 214. In alternative embodiments, one or both of the plurality of object motion sensors 206 and the plurality of apparatus motion sensors 212 may include more than two sensors (e.g., a tier of sensors, each with a different power consumption level).

In operation, when the second sensor 210 of the plurality of object motion sensors 206 detects a stimulus (as shown at 218), the sensor logic 204 instructs the first sensor 208 of the plurality of object motion sensors 206 to transition from the dormant mode to the active mode. For example, the second sensor 210 may be an echolocator that detects movement of an object with a lower resolution than the first sensor 208 (e.g., a video camera). When the second sensor 216 of the plurality of apparatus motion sensors 212 detects a stimulus (as shown at 220), the sensor logic 204 instructs the first sensor 214 of the plurality of apparatus motion sensors 212 to transition from the dormant mode to the active mode. When the second sensor 216 is an accelerometer and the first sensor 102 is a GPS sensor, the accelerometer may be able to detect motion of the apparatus 202 but may not be able to accurately determine a location of the apparatus 202 (in contrast to the GPS sensor).

In response to the first sensor 208 of the plurality of object motion sensors 206 transitioning from the dormant mode to the active mode, the sensor logic 204 deactivates the second sensor 210 of the plurality of object motion sensors 206, as shown at 218. Similarly, in response to the first sensor 214 of the plurality of apparatus motion sensors 212 transitioning from the dormant mode to the active mode, the sensor logic 204 deactivates the second sensor 216 of the plurality of apparatus motion sensors 212, as shown at 220. In a particular embodiment, zero power is consumed by the second sensors 210, 216 when deactivated. Alternatively, the amount of power consumed by the second sensors 210, 216 when deactivated may be greater than zero but at a low level. That is, deactivation of the second sensors 210, 216 may be associated with a dormant mode. Thus, FIG. 2 illustrates that battery life of the apparatus 202 may be conserved by operating in the power save mode 217 until detection of stimuli by a secondary sensor that may provide lower resolution sensing capabilities but consumes less power when activated than a primary sensor in an active mode.

Figure 3:
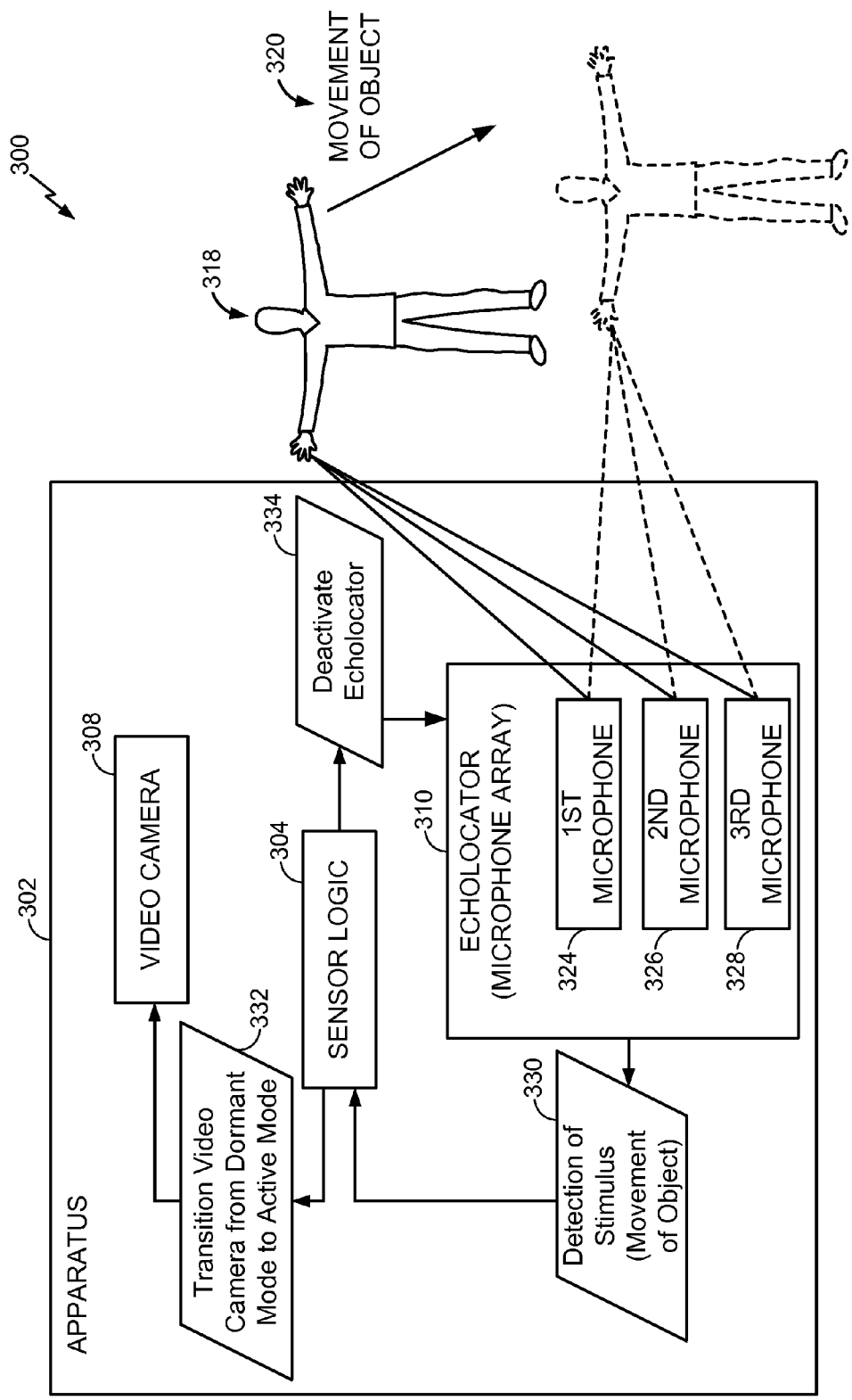
FIG. 3 is a block diagram of a third particular illustrative embodiment of a system of cooperative processing among sensors to improve battery life.

Referring to FIG. 3, another particular illustrative embodiment of a system of cooperative processing among sensors to improve battery life is disclosed and generally designated 300. The system 300 of FIG. 3 illustrates that cooperative processing may enable an apparatus 302 to transition from a power save mode to an increased sensitivity mode when a secondary sensor (e.g., an echolocator) detects a stimulus. Thus, a relatively low power sensor (e.g., the echolocator) maintains environmental awareness while a relatively high power sensor (e.g., a video camera) is in a dormant mode, in order to improve battery life. To provide improved resolution with respect to detection of movement, the relatively high power sensor may transition to an active mode in response to detection of a stimulus by the relatively low power sensor. In response, the relatively low power sensor may be deactivated to further improve battery life.

The apparatus 302 of FIG. 3 includes sensor logic 304, a video camera 308, and an echolocator 310. Both the video camera 308 and the echolocator 310 are designed to detect movement of an object 318, as illustrated at 320. For example, the video camera 308 of FIG. 3 may correspond to the first sensor 102 of FIG. 1 or the first sensor 208 of FIG. 2, and the echolocator 310 of FIG. 3 may correspond to the second sensor 104 of FIG. 1 or the second sensor 210 of FIG. 2. The echolocator 310 may include multiple directional microphones (e.g., an array of microphones). For example, in the embodiment illustrated in FIG. 3, the array of microphones includes a first microphone 324, a second microphone 326, and a third microphone 328. In alternative embodiments, two microphones may be utilized, or more than three microphones may be utilized.

In operation, the video camera 308 may initially be in a dormant mode while the echolocator 310 may be activated. Thus, the apparatus 302 may be operating in a power save mode (e.g., the power save mode 110 of FIG. 1, or the power save mode 217 of FIG. 2). The echolocator 310 may detect movement of the object 318, as shown at 320. For example, the first microphone 324, the second microphone 326, and the third microphone 328 may utilize ultrasonic ranging to detect movement of the object 318. Upon detection of the stimulus (i.e., the movement), the echolocator 310 communicates corresponding information 330 to the sensor logic 304. In response, the sensor logic 304 communicates instructions 332 to the video camera 308 to transition from the dormant mode (i.e., the power save mode) to the active mode (i.e., the increased sensitivity mode). Further, the sensor logic 304 communicates instructions 334 to deactivate the echolocator 310. The video camera 308 may remain in the active mode until no stimuli are received that satisfy threshold detection criteria (as described with respect to FIG. 4).

As a result, battery life of the apparatus 302 may be conserved by utilizing a secondary sensor (i.e., the echolocator 310) that may provide lower resolution sensing capabilities than a primary sensor (i.e., the video camera 308) but consumes less power when activated than the primary sensor. As such, the apparatus 302 is able to maintain environmental awareness with respect to movement of the object 318 that would be unavailable if the primary sensor were simply transitioned to a dormant mode without a secondary sensor being activated.

Figure 4:
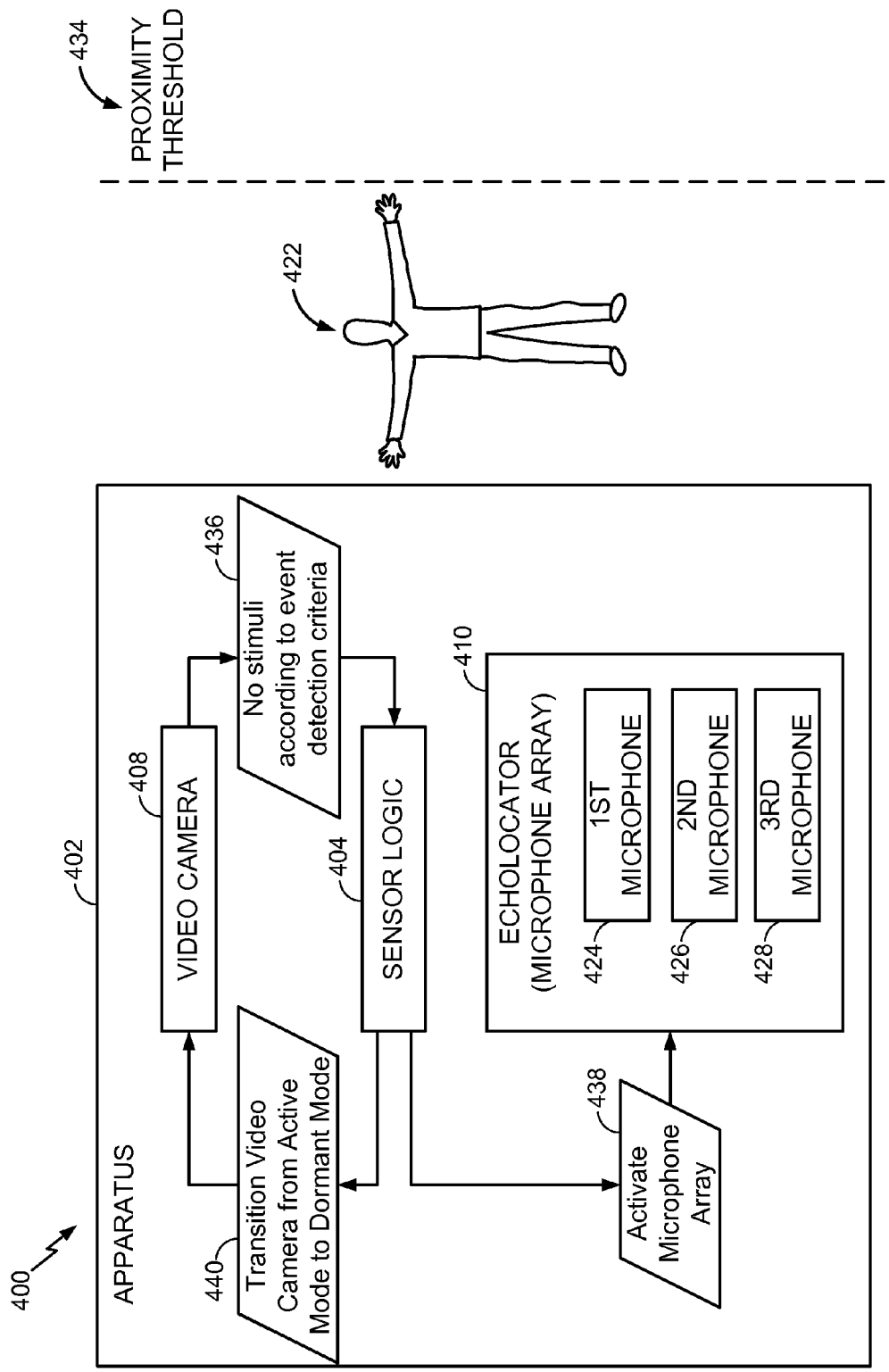
FIG. 4 is a block diagram of a fourth particular illustrative embodiment of a system of cooperative processing among sensors to improve battery life.

Referring to FIG. 4, another particular illustrative embodiment of a system of cooperative processing among sensors to improve battery life is disclosed and generally designated 400. The system 400 of FIG. 4 illustrates that cooperative processing may enable an apparatus 402 to transition from an increased sensitivity mode to a power save mode when a primary sensor (e.g., a video camera) does not detect one or more events that satisfy event detection criteria. Thus, a relatively high power sensor of the apparatus 402 may transition to a dormant mode while a relatively low power sensor (e.g., an echolocator) is activated in order to maintain environmental awareness and improve battery life of the apparatus 402.

The apparatus 402 includes sensor logic 404, a video camera 408, and an echolocator 410. Both the video camera 408 and the echolocator 410 are designed to detect movement of an object 422. In an illustrative embodiment, the video camera 408 of FIG. 4 corresponds to the first sensor 102 of FIG. 1, the first sensor 208 of FIG. 2, or the video camera 308 of FIG. 3. Similarly, the echolocator 410 of FIG. 4 may correspond to the second sensor 104 of FIG. 1, the second sensor 210 of FIG. 2, or the echolocator 310 of FIG. 3. The echolocator 410 may include an array of microphones. For example, in the embodiment illustrated in FIG. 4, the array of microphones includes a first microphone 424, a second microphone 426, and a third microphone 428. In other embodiments, a different number of microphones may be used to provide echolocation capabilities. The echolocator 410 may be considered to provide adequate motion sensing capabilities when the object 422 is within a proximity threshold 434 but may not be considered to have adequate motion sensing capabilities when the object 422 is outside of the proximity threshold 434.

In operation, the video camera 408 may initially be in an active mode while the echolocator 410 may be deactivated. Thus, the apparatus 402 may be operating in an increased sensitivity mode (e.g., the increased sensitivity mode 108 of FIG. 1, or the increased sensitivity mode 221 of FIG. 2). The video camera 408 may not detect stimuli that satisfy one or more event detection criteria. For example, the video camera 408 may not detect a threshold number of recognized hand gestures within a predetermined period of time. As a result, the video camera 408 communicates corresponding information 436 to the sensor logic 404. Further, in the embodiment illustrated, the object 422 is within the proximity threshold 434. As such, the sensor logic 404 may communicate instructions 440 to the video camera 408 to transition from the active mode to the dormant mode. Further, the sensor logic 404 may communicate instructions 438 to the echolocator 410 to activate the microphone array in order to maintain environmental awareness. In alternative embodiments, when the object 422 is not within the proximity threshold 434, the sensor logic 404 may not communicate the instructions 440 to the video camera 408 to transition to the dormant mode. Thus, the video camera 408 may remain in the active mode despite a lack of stimuli that satisfy event detection criteria when the echolocator 410 is not considered to provide adequate motion sensing capabilities.

Thus, the apparatus 402 may conserve battery life by utilizing a secondary sensor (i.e., the echolocator 410) that may provide lower resolution sensing capabilities than a primary sensor (i.e., the video camera 408) but consumes less power when activated than an active mode of the primary sensor. As such, the apparatus 402 is able to maintain environmental awareness with respect to movement of the object 422 that would be unavailable if the primary sensor were simply transitioned to a dormant mode without a secondary sensor being activated. Further, FIG. 4 illustrates that a secondary sensor may not provide adequate sensing capabilities when the object 422 is outside of the proximity threshold 434. In this case, the primary sensor may remain in an active mode to provide adequate environmental awareness.

Thus, the sensor logic described with respect to FIGS. 1-4 (i.e., the sensor logic 106 of FIG. 1, the sensor logic 204 of FIG. 2, the sensor logic 304 of FIG. 3, and the sensor logic 404 of FIG. 4) may be configured to perform various functions associated with improving battery life of an apparatus. For example, the sensor logic 106 of FIG. 1 may be configured to perform the function of detecting the first sensor 102 transitioning from an active mode to a dormant mode (e.g., from the increased sensitivity mode 108 to the power save mode 110). To illustrate, detection circuitry may be utilized to detect a voltage change (or other change) associated with the transition. For example, the first sensor 102 may be configured to operate at a first voltage level in the active mode and at a second voltage level in the dormant mode, and the detection circuitry may detect a decrease in voltage level corresponding to a difference between the first voltage level and the second voltage level.

The sensor logic 106 may be configured to perform the function of activating the second sensor 104 upon detecting the first sensor 102 transitioning to the dormant mode (e.g., from the increased sensitivity mode 108 to the power save mode 110), where the second sensor 104 is deactivated when the first sensor 102 is in the active mode. To illustrate, signal generation circuitry may be communicatively coupled to the first sensor 102 via a first signal line and to the second sensor 104 via a second signal line. The signal generation circuitry may be utilized to generate an activation signal and to communicate the activation signal to the second sensor 104 via the second signal line.

The sensor logic 106 may be configured to perform the function of instructing the first sensor 102 to transition from the dormant mode to the active mode (e.g., from the power save mode 110 to the increased sensitivity mode 108) in response to the second sensor 104 detecting a stimulus. To illustrate, the signal generation circuitry may be utilized to generate a signal to transition to the active mode and to communicate the transition signal to the first sensor 102 via the first signal line. The sensor logic 106 may be configured to perform the function of deactivating the second sensor 104 in response to the first sensor 102 transitioning to the active mode (e.g., from the power save mode 110 to the increased sensitivity mode 108). To illustrate, the signal generation circuitry may be utilized to generate a deactivation signal and to communicate the deactivation signal to the second sensor 104 via the second signal line.

Alternatively, separate signal generation circuitry may be utilized to communicate instructions to the first sensor 102 and the second sensor 104. In this case, first signal generation circuitry may be communicatively coupled to the first sensor 102 via the first signal line, and second signal generation circuitry may be communicatively coupled to the second sensor 104 via the second signal line.

The sensor logic 106 may include any collection of systems or sub-systems that individually or jointly execute a set, or multiple sets, of instructions to perform the functions described above. In one embodiment, the sensor logic 106 utilizes one or more sets of instructions (e.g., software) that resides entirely in memory (see FIG. 7) to perform the functions. Alternatively, the sensor logic 106 may perform the functions using software, application specific integrated circuits, programmable logic arrays and other hardware devices, or any combination thereof. Alternatively, one or more functions performed by the sensor logic 106 may be performed by a processor executing instructions to determine the transitioning of a high-power sensor between active and dormant modes and to activate a low-power sensor to maintain environmental awareness while the high-power sensor is in the dormant mode.

In a particular embodiment, the first sensor 102 and the second sensor 104 are configured to detect movement of an object. In this case, the first sensor 102 provides higher resolution sensing of movement of the object than the second sensor 104. To illustrate, the first sensor 102 may include a video camera, and the second sensor 104 may include an echolocator (that may utilize an array of microphones for ultrasonic ranging). In alternative embodiments, the first sensor 102 or the second sensor 104 may utilize other motion sensing technologies to detect movement of an object (that is external to an apparatus that includes the sensors).

In another embodiment, the first sensor 102 and the second sensor 104 are configured to detect movement of an apparatus. In this case, the first sensor 102 provides higher resolution sensing of movement of the apparatus than the second sensor 104. To illustrate, the first sensor 102 may include a GPS sensor, and the second sensor 104 may include an accelerometer, a gyroscope, a compass, or another motion detector. In alternative embodiments, the first sensor 102 or the second sensor 104 may utilize other motion sensing technologies to detect movement of an apparatus (that includes the sensors).

Figure 5:
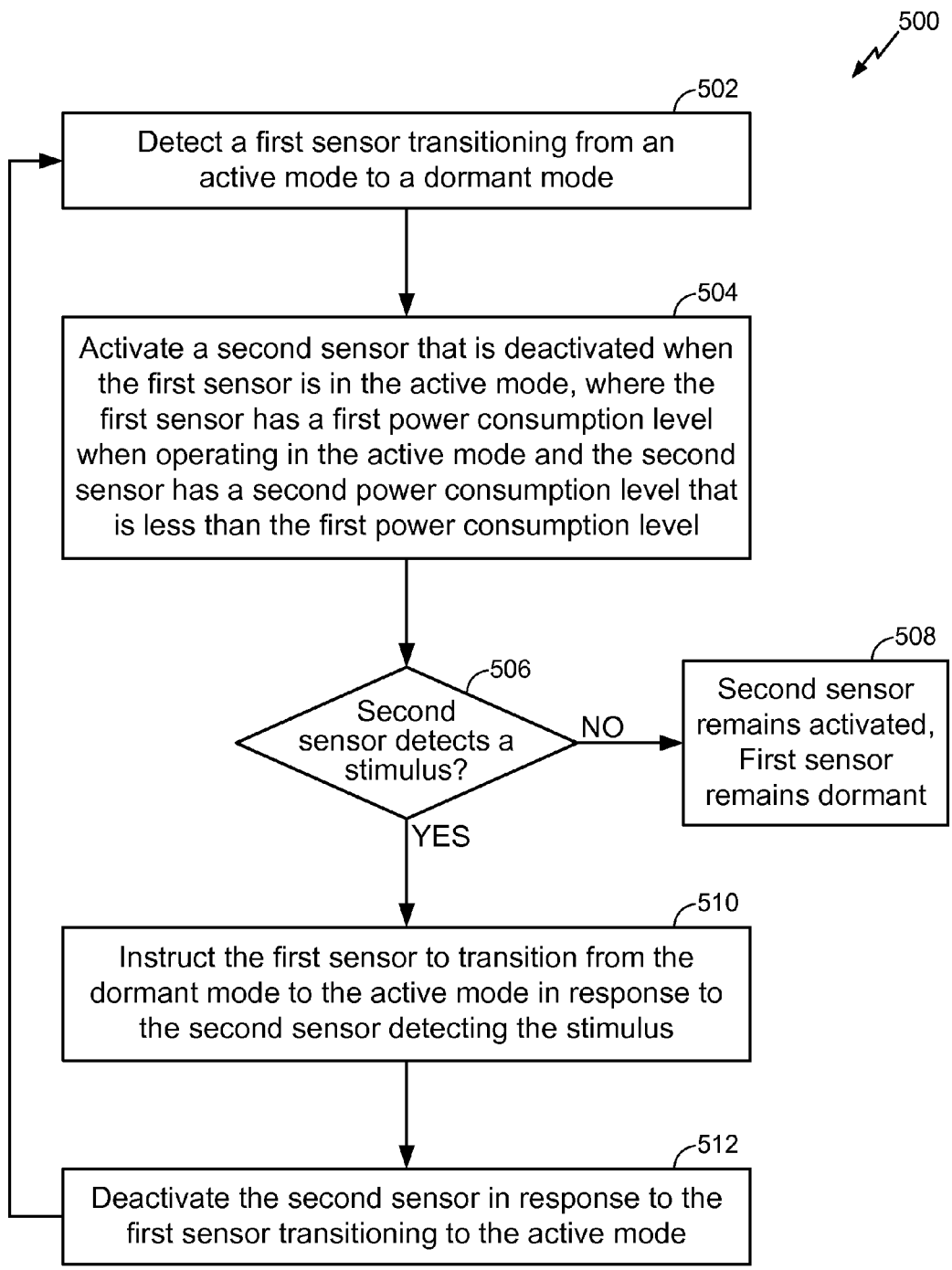
FIG. 5 is a flow chart of a first illustrative embodiment of a method of cooperative processing among sensors to improve battery life.

Referring to FIG. 5, a first illustrative embodiment of a method of cooperative processing among sensors to improve battery life is disclosed and generally designated 500. FIG. 5 illustrates that by transitioning a first sensor into a dormant mode and activating a second sensor that consumes less power, an ability to detect environmental stimuli may be preserved while optimizing battery life.

The method 500 may include detecting a first sensor of an apparatus transitioning from an active mode to a dormant mode, at 502. For example, the first sensor 102 of FIG. 1 may transition from the increased sensitivity mode 108 to the power save mode 110 (i.e., the sensor logic 106 may provide instructions to the first sensor 102 to sleep 112). In a particular embodiment, the first sensor is an object motion sensor (e.g., a video camera). To illustrate, the video camera 408 of FIG. 4 may transition from an active mode to a dormant mode in response to the video camera 408 not detecting stimuli that satisfy event detection criteria. In another embodiment, the first sensor is an apparatus motion sensor (e.g., a GPS sensor). For example, the first sensor 214 of FIG. 2 may transition from an active mode to a dormant mode in response to lack of movement of the apparatus 202.

The method 500 includes activating a second sensor of the apparatus upon detection of the first sensor transitioning from the active mode to the dormant mode, at 504. The power consumption level of an apparatus (e.g., the apparatus 202 of FIG. 2, the apparatus 302 of FIG. 3, or the apparatus 402 of FIG. 4) may be reduced when the second sensor is activated in response to the first sensor transitioning to the dormant mode, resulting in increased battery life while maintaining awareness of the environment of the apparatus (including positioning). The second sensor is deactivated when the first sensor is in the active mode. In one embodiment, zero power is consumed by the second sensor when the second sensor is deactivated. The first sensor has a first power consumption level when operating in the active mode, and the second sensor (when activated) has a second power consumption level that is less than the first power consumption level.

When activated, the second sensor is able to detect a stimulus (i.e., movement of an object or movement of the apparatus). Thus, while the first sensor may be dormant, the apparatus is still able to detect certain stimuli. The second sensor may consume less power and may provide lower resolution sensing capabilities than the first sensor. For example, a video camera may provide higher resolution sensing of movement of an object than an echolocator. As another example, a GPS sensor may provide improved capabilities with respect to detecting movement of an apparatus than an accelerometer, a gyroscope, or a compass.

The method 500 may include determining whether the second sensor has detected a stimulus, at 506. For example, when the second sensor is an echolocator, the stimulus may include detection of movement of an object. As another example, when the second sensor is an accelerometer (or a gyroscope or compass), the stimulus may include detection of movement of the apparatus. When the second sensor does not detect a stimulus, the second sensor may remain activated and the first sensor may remain dormant, at 508. When the second sensor does detect a stimulus, the method 500 may include instructing the first sensor to transition to the active mode, at 510. In response to the transition, the second sensor may be deactivated, at 512. Thus, battery life can be conserved by using a lower-power sensor operation until the second sensor detects a stimulus. As shown in FIG. 5, the method 500 may repeat when the first sensor transitions to the dormant mode in response to lack of stimuli that satisfy event detection criteria.

Figure 6:
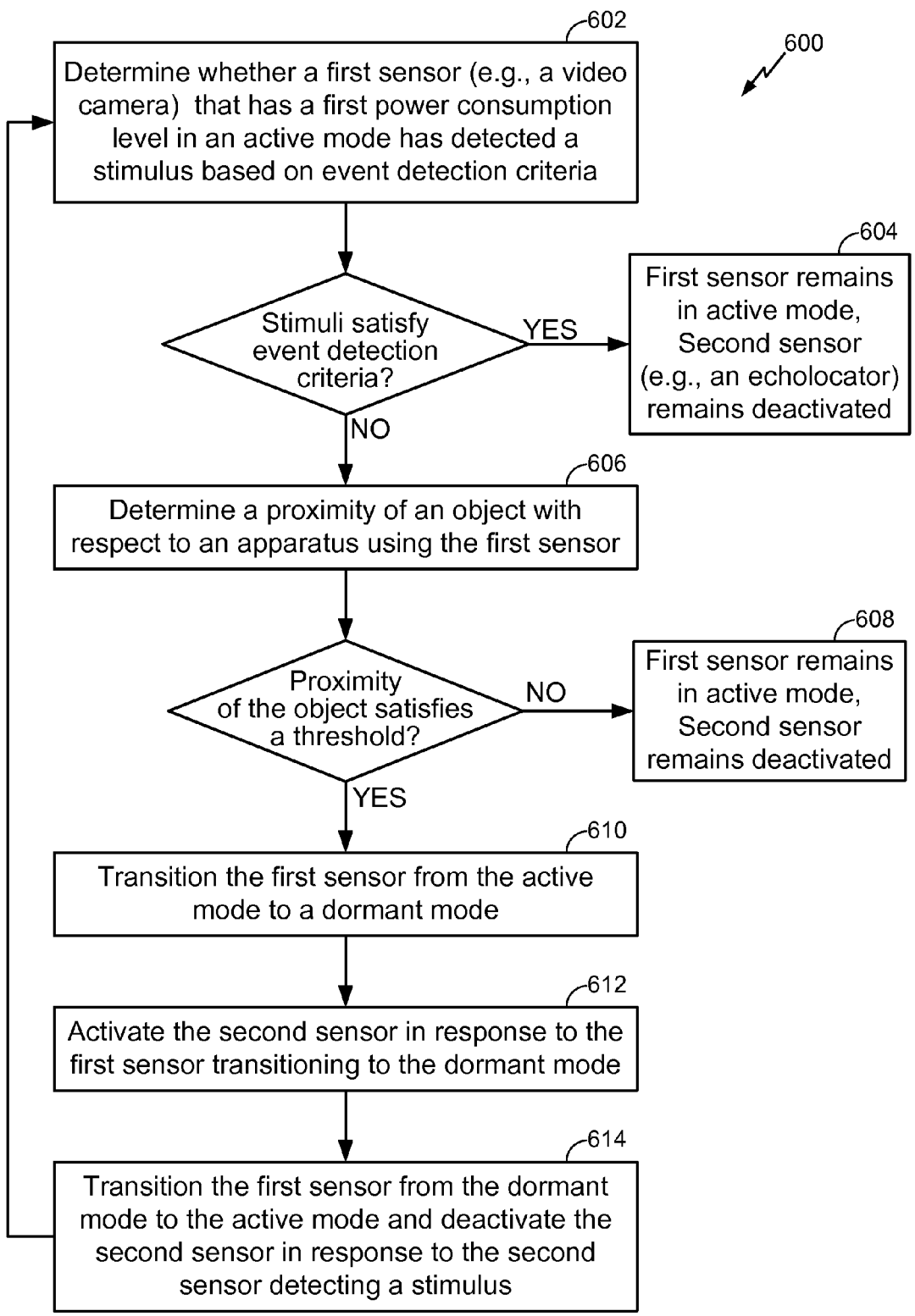
FIG. 6 is a flow chart of a second illustrative embodiment of a method of cooperative processing among sensors to improve battery life.

Referring to FIG. 6, a second illustrative embodiment of a method of cooperative processing among sensors to improve battery life is disclosed and generally designated 600. FIG. 6 illustrates that event detection criteria and a proximity of an object may be used to determine whether to transition a first sensor from an active mode into a dormant mode in order to improve battery life.

The method 600 may include determining whether a first sensor (e.g., a video camera in an active mode) has detected a stimulus based on event detection criteria, at 602. The first sensor has a first power consumption level in the active mode. For example, the first sensor may include the video camera 408 of FIG. 4. To illustrate, the video camera may be used to detect hand gestures, and the event detection criteria may include a threshold number of recognized hand gestures within a predetermined period of time. A high number of recognized hand gestures may indicate that a hand gesture recognition (HGR) application is being actively utilized (justifying the video camera with the relatively high power consumption level remaining active). By contrast, detection of relatively few hand gestures may indicate that a lower resolution sensor (e.g., an echolocator) is considered satisfactory to detect stimuli.

When the first sensor has detected stimuli that satisfy the event detection criteria, the first sensor may remain in the active mode and the second sensor may remain deactivated, at 604. In the embodiment illustrated, when the first sensor has not detected stimuli that satisfy the event detection criteria, the method 600 includes determining a proximity of an object with respect to the apparatus using the first sensor, at 606. When the proximity of the object does not satisfy a threshold (e.g., the proximity threshold 434 of FIG. 4), the first sensor may remain in the active mode and the second sensor may remain deactivated, at 608. Thus, despite the fact that the first sensor has not detected stimuli that satisfy the event detection criteria, the second sensor may not be considered satisfactory in ensuring detection of environmental stimuli when the proximity threshold is not satisfied. For example, an echolocator may be considered satisfactory in detecting movement of an object when the object is relatively close to the apparatus. By contrast, when the object is relatively far from the apparatus, the echolocator may be considered inadequate due to the fact that the echolocator provides lower resolution sensing of movement of the object than the video camera.

When the proximity of the object satisfies the threshold, the first sensor may transition from the active mode to the dormant mode, at 610. The method 600 includes activating the second sensor in response to the first sensor transitioning to the dormant mode, at 612.

As illustrated in FIG. 6, the first sensor may transition from the dormant mode to the active mode in response to the second sensor detecting a stimulus, at 614. In this case, the second sensor is deactivated (e.g., consumes zero power), and the method 600 repeats. Thus, FIG. 6 illustrates that a first sensor with a relatively high power consumption level may use event detection criteria when determining whether to transition from an active mode to a dormant mode, while detection of any stimulus by a relatively low power sensor may be sufficient to instruct the first sensor to transition to the active mode. Further, FIG. 6 illustrates that a sensor with a relatively low power consumption level may not be utilized to conserve power when proximity criteria are not satisfied.

Figure 7:
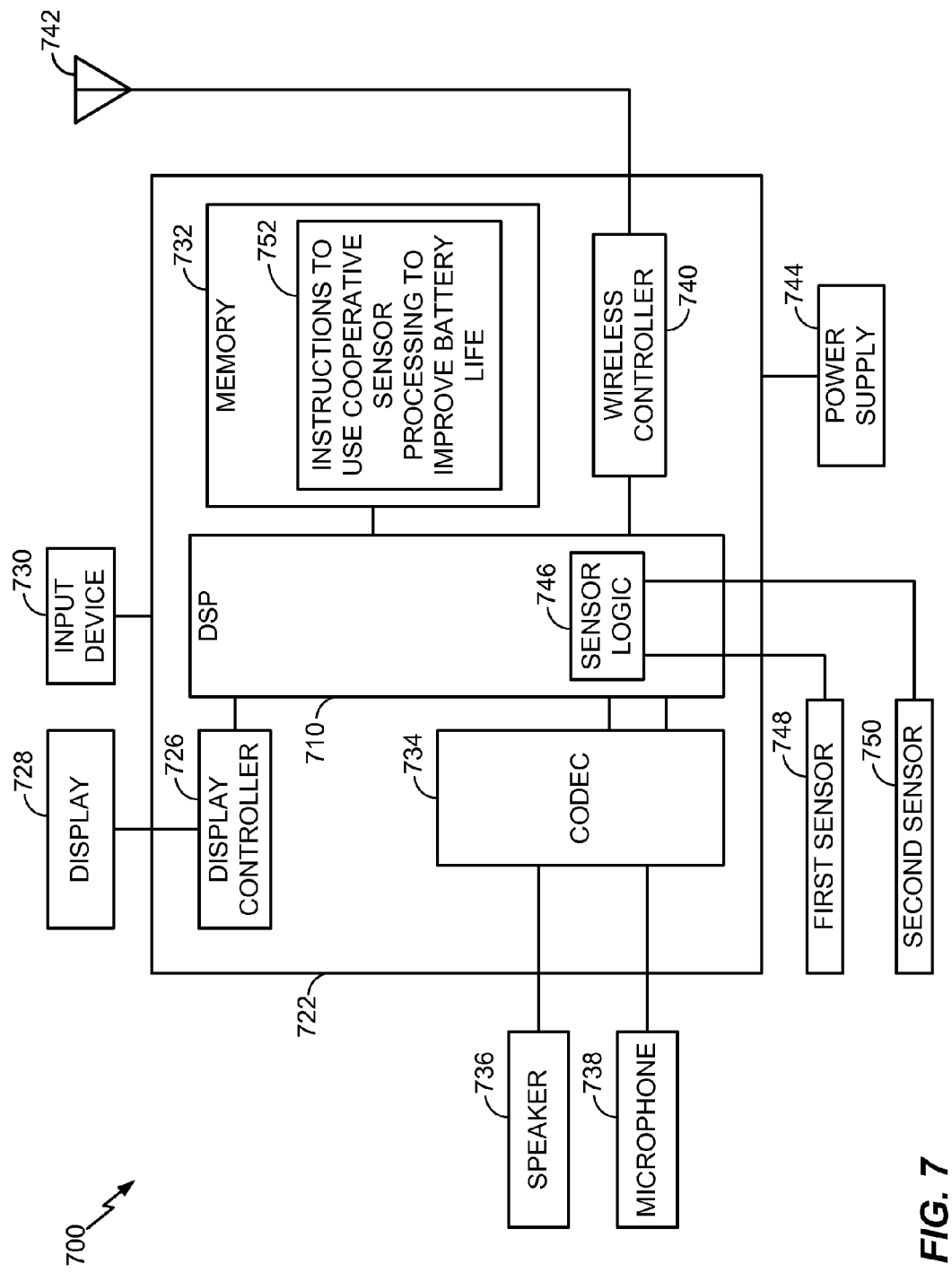
FIG. 7 is a block diagram of a portable electronic device that includes logic to improve battery life by utilizing cooperative processing among sensors.

Referring to FIG. 7, a block diagram of a particular illustrative embodiment of a portable electronic device including instructions to improve battery life by utilizing cooperative processing among sensors is depicted and generally designated 700. In one embodiment, the portable electronic device 700 of FIG. 7 includes the system 100 of FIG. 1, the apparatus 202 of FIG. 2, the apparatus 302 of FIG. 3, or the apparatus 402 of FIG. 4. Further, all or part of the methods described in FIGS. 5 and 6 may be performed at the portable electronic device 700 of FIG. 7. The portable electronic device 700 includes a processor, such as a digital signal processor (DSP) 710, coupled to a memory 732. The DSP 710 may utilize sensor logic 746 in order to improve battery life by using cooperative sensor processing. The memory 732 may include instructions 752 to use cooperative sensor processing to improve battery life. For example, in the embodiment illustrated in FIG. 7, the portable electronic device 700 includes a first sensor 748 and a second sensor 750, and the sensor logic 746 manages the sensors 748, 750 in order to improve battery life. For example, the first sensor 748 may correspond to the first sensor 102 of FIG. 1, and the second sensor 750 may correspond to the second sensor 104 of FIG. 1. As another example, the first sensor 748 may correspond to the video camera 308 of FIG. 3 or the video camera 408 of FIG. 4, and the second sensor 750 may correspond to the echolocator 310 of FIG. 3 or the echolocator 410 of FIG. 4.

As a further example, the first sensor 748 may correspond to one of the object motion sensors 206 of FIG. 2 (e.g., the first sensor 208), and the second sensor 750 may correspond to another one of the object motion sensors 206 (e.g., the second sensor 210). Similarly, the first sensor 748 may correspond to one of the apparatus motion sensors 212 of FIG. 2 (e.g., the first sensor 214), and the second sensor 750 may correspond to another one of the apparatus motion sensors 212 (e.g., the second sensor 216). In alternative embodiments, the portable electronic device 700 may include more than two sensors (i.e., sensors associated with both object motion sensors and apparatus motion sensors). For example, the portable electronic device 700 may include both the object motion sensors 206 and the apparatus motion sensors 212 of FIG. 2. Further, the portable electronic device 700 may not include both object motion sensors and apparatus motion sensors (see FIGS. 3 and 4 that each illustrate an apparatus with object motion sensors).

The memory 732 is a non-transitory tangible computer readable storage medium that stores the instructions 752 to use cooperative sensor processing to improve battery life. The instructions 752 are executable by the DSP 710 to implement the sensor logic 746. For example, the instructions 752 may include instructions to receive information indicating detection of the first sensor 748 transitioning from an active mode to a dormant mode, wherein the first sensor 748 has a first power consumption level when operating in the active mode. The instructions 752 may include instructions to activate the second sensor 750 that is deactivated when the first sensor 748 is in the active mode in response to receiving the information. The second sensor 750 has a second power consumption level that is less than the first power consumption level. The instructions 752 may include instructions to transition the first sensor 748 from the dormant mode to the active mode in response to the second sensor 750 detecting a stimulus. The instructions 752 may include instructions to deactivate the second sensor 750 in response to the first sensor 748 transitioning to the active mode. In a particular embodiment, zero power is consumed by the second sensor 750 when the second sensor 750 is deactivated.

FIG. 7 also shows a display controller 726 that is coupled to the digital signal processor 710 and to a display 728. A coder/decoder (CODEC) 734 can also be coupled to the digital signal processor 710. A speaker 736 and a microphone 738 can be coupled to the CODEC 734. FIG. 7 also indicates that a wireless controller 740 can be coupled to the digital signal processor 710 and to a wireless antenna 742. In a particular embodiment, the DSP 710, the display controller 726, the memory 732, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, the power supply 744, the first sensor 748, and the second sensor 750 are external to the system-on-chip device 722. However, each of the display 728, the input device 730, the speaker 736, the microphone 738, the wireless antenna 742, the power supply 744, the first sensor 748, and the second sensor 750 can be coupled to a component of the system-on-chip device 722, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
a first sensor having a first power consumption level when operating in an active mode, the first sensor further having a dormant mode;
a second sensor having a second power consumption level that is less than the first power consumption level, wherein the second sensor is deactivated in response to the first sensor operating in the active mode; and
circuitry configured to determine whether to transition the first sensor from the active mode to the dormant mode, wherein the first sensor includes a video camera and the second sensor includes an echolocator, wherein the echolocator generates an ultrasound signal, and wherein the echolocator detects a return of the ultrasound signal, the circuitry further configured to activate the second sensor based on the first sensor transitioning from the active mode to the dormant mode.

2. The apparatus of claim 1, wherein the circuitry is further configured to instruct the first sensor to transition from the dormant mode to the active mode in response to the second sensor detecting a stimulus.

3. The apparatus of claim 2, wherein the stimulus includes a threshold number of hand gestures in a period of time.

4. The apparatus of claim 2, wherein the stimulus is associated with a movement of an object.

5. The apparatus of claim 4, wherein the video camera provides higher resolution sensing of movement of the object than the echolocator.

6. The apparatus of claim 1, wherein the echolocator includes multiple directional microphones.

7. The apparatus of claim 1, further comprising:
a global positioning system (GPS) sensor; and
a motion detector.

8. The apparatus of claim 7, wherein the motion detector includes an accelerometer.

9. The apparatus of claim 7, wherein the motion detector includes a gyroscope.

10. The apparatus of claim 7, wherein the motion detector includes a compass.

11. The apparatus of claim 7, wherein the GPS sensor has a third power consumption level when operating in a second active mode, the GPS sensor further having a second dormant mode, wherein the motion detector has a fourth power consumption level that is less than the third power consumption level, wherein the motion detector is deactivated in response to the GPS sensor operating in the second active mode.

12. The apparatus of claim 1, wherein the circuitry is further configured to determine a proximity of an object when an event detection criterion associated with the first sensor is not satisfied, wherein the circuitry is further configured to transition the video camera to the dormant mode and to activate the echolocator when the proximity of the object satisfies a proximity threshold, and wherein the video camera remains in the active mode and the echolocator remains deactivated when the proximity of the object does not satisfy the proximity threshold.

13. The apparatus of claim 1, wherein the circuitry is further configured to determine a number of hand gestures in a period of time when a event detection criterion associated with the first sensor is not satisfied, wherein the event detection criterion includes a gesture threshold, wherein the circuitry is further configured to determine whether to transition the first sensor from the active mode to the dormant mode based on the event detection criterion, wherein the circuitry is further configured to transition the video camera to the dormant mode and to activate the echolocator when the number of hand gestures in the period of time satisfies the gesture threshold, and wherein the video camera remains in the active mode and the echolocator remains deactivated when the number of hand gestures in the period of time does not satisfy the gesture threshold.

14. The apparatus of claim 1, wherein a deactivated power consumption level of the second sensor is greater than zero when the second sensor is deactivated.

15. A method, comprising:
activating, from a dormant state, a second sensor of an apparatus upon detection of a first sensor of the apparatus transitioning from an active mode to a dormant mode,
wherein the first sensor has a first power consumption level when operating in the active mode and the second sensor has a second power consumption level that is less than the first power consumption level, wherein the first sensor detects movement of the apparatus and the second sensor detects movement of the apparatus, and wherein the first sensor provides higher resolution sensing of movement of the apparatus than the second sensor.

16. The method of claim 15, further comprising:
instructing the first sensor to transition from the dormant mode to the active mode based on the second sensor detecting a stimulus; and
deactivating the second sensor in response to the first sensor transitioning to the active mode, wherein zero power is consumed by the second sensor when the second sensor is deactivated.

17. The method of claim 16, wherein the apparatus includes a video camera, and an echolocator that utilizes multiple directional microphones, wherein the echolocator generates an ultrasound signal, and wherein the echolocator detects a return of the ultrasound signal.

18. The method of claim 16, wherein the first sensor includes a global positioning system (GPS) sensor to track a location of the apparatus, wherein the second sensor includes a motion detector, and wherein the stimulus includes a detection of movement of the apparatus.

19. The method of claim 18, wherein the motion detector includes one of an accelerometer, a gyroscope, or a compass.

20. An apparatus, comprising:
a first sensor;
a second sensor; and
means for activating the second sensor upon detecting the first sensor transitioning from an active mode to a dormant mode, wherein the second sensor is deactivated based on the first sensor being in the active mode,
wherein the first sensor has a first power consumption level when operating in the active mode and the second sensor has a second power consumption level that is less than the first power consumption level, wherein the first sensor includes first means for detecting movement of the apparatus and the second sensor includes second means for detecting movement of the apparatus, and wherein the first sensor provides higher resolution sensing of movement of the apparatus than the second sensor.

21. The apparatus of claim 20, further comprising:
means for instructing the first sensor to transition from the dormant mode to the active mode based on the second sensor detecting a stimulus; and
means for deactivating the second sensor based on the first sensor transitioning to the active mode, wherein zero power is consumed by the second sensor when the second sensor is deactivated.

22. The apparatus of claim 20, further comprising:
first means for detecting movement of an object; and
second means for detecting movement of the object, wherein the first means for detecting movement of the object provides higher resolution sensing of movement of the object than the second means for detecting movement of the object.

23. The apparatus of claim 20, wherein a third power consumption level of the second sensor is greater than zero when the second sensor is deactivated.

24. A computer readable tangible medium comprising instructions that, when executed by a processor, cause the processor to:
receive information indicating detection of a first sensor transitioning from an active mode to a dormant mode, wherein the first sensor has a first power consumption level when operating in the active mode; and
activate a second sensor that is deactivated based on receiving the information, wherein the second sensor has a second power consumption level that is less than the first power consumption level, wherein the first sensor and the second sensor detect movement of an apparatus, wherein the apparatus includes the first sensor and the second sensor, and wherein the first sensor provides higher resolution sensing of movement of the apparatus than the second sensor.

25. The computer readable tangible medium of claim 24, further comprising instructions that, when executed by the processor, cause the processor to:
transition the first sensor from the dormant mode to the active mode based on the second sensor detecting a stimulus; and
deactivate the second sensor based on the first sensor transitioning to the active mode, wherein zero power is consumed by the second sensor when the second sensor is deactivated.

* * * * *